(12) United States Patent
Rajendran et al.

(10) Patent No.: US 11,700,179 B2
(45) Date of Patent: Jul. 11, 2023

(54) CONFIGURATION OF LOGICAL NETWORKING ENTITIES

(71) Applicant: VMware, Inc., Palo Alto, CA (US)

(72) Inventors: Parasuramji Rajendran, San Jose, CA (US); Li Sun, Sunnyvale, CA (US); Chidambareswaran Raman, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/214,254

(22) Filed: Mar. 26, 2021

(65) Prior Publication Data
US 2022/0311669 A1 Sep. 29, 2022

(51) Int. Cl.
*G06F 15/177* (2006.01)
*H04L 41/0893* (2022.01)
*H04L 41/0873* (2022.01)

(52) U.S. Cl.
CPC ...... *H04L 41/0893* (2013.01); *H04L 41/0873* (2013.01)

(58) Field of Classification Search
CPC .......... H04L 41/0893; H04L 41/0873
See application file for complete search history.

(56) References Cited

U.S. PATENT DOCUMENTS

| | | | |
|---|---|---|---|
| 8,583,769 B1 * | 11/2013 | Peters | G06F 9/542 709/221 |
| 8,966,029 B2 | 2/2015 | Zhang et al. | |
| 10,447,541 B2 | 10/2019 | Gaikwad et al. | |
| 10,742,503 B2 | 8/2020 | Wan et al. | |
| 10,749,751 B2 | 8/2020 | Wan et al. | |
| 11,088,919 B1 * | 8/2021 | Chandrashekhar | H04L 41/0213 |
| 2004/0073659 A1 | 4/2004 | Rajsic et al. | |
| 2004/0177135 A1 | 9/2004 | Monaton et al. | |
| 2011/0246460 A1 | 10/2011 | Hsieh et al. | |
| 2015/0117256 A1 | 4/2015 | Sabaa et al. | |
| 2015/0142938 A1 | 5/2015 | Koponen et al. | |
| 2015/0281285 A1 | 10/2015 | Bharali et al. | |
| 2015/0317145 A1 | 11/2015 | Katariya et al. | |
| 2016/0105534 A1 | 4/2016 | Li et al. | |
| 2016/0380815 A1 | 12/2016 | Agarwal et al. | |
| 2017/0078150 A1 | 3/2017 | Koganti et al. | |
| 2018/0063195 A1 | 3/2018 | Nimmagadda et al. | |
| 2018/0284985 A1 * | 10/2018 | Bansal | G06F 3/067 |
| 2019/0303137 A1 | 10/2019 | Chaganti et al. | |
| 2019/0342158 A1 | 11/2019 | Wan et al. | |
| 2019/0342175 A1 * | 11/2019 | Wan | H04L 41/0816 |

* cited by examiner

*Primary Examiner* — Wing F Chan
*Assistant Examiner* — Joseph R Maniwang
(74) *Attorney, Agent, or Firm* — Adeli LLP (57) ABSTRACT

Some embodiments provide a method, for configuring logical network entities at a host computer. The method receives configuration data for a particular logical networking entity implemented at the host computer. The method identifies that the configuration data for the particular logical networking entity includes at least two conflicting configuration settings for the particular logical networking entity. At least one of the configuration settings for the particular logical networking entity is based on association of a configuration profile to a group of logical entities that includes the particular logical networking entity. The method determines a particular one of the conflicting configuration settings with a highest priority to apply to the particular logical networking entity at the host computer.

24 Claims, 7 Drawing Sheets

CONFIGURATION OF LOGICAL NETWORKING ENTITIES

BACKGROUND

In software-defined networking (SDN), a network management and control system may have different types of users that provide configuration information to configure the network. The system will often have various different types of configurable entities, with certain entities only available for one of the other types of users to configure. However, the configuration of a first entity that is under the purview of a first type of user might affect entities that are under the purview of a second user that is not allowed to configure the first entity. As such, solutions that enable the first user to affect the first entity without direct access to that entity would be useful.

BRIEF SUMMARY

Some embodiments provide a method for resolving conflicting configuration settings for logical network entities that pushes the determination of effective configuration for these entities down to the host computers that implement the logical network entities. Specifically, as a result of different ways of receiving configuration data for a logical network entity, a particular entity (e.g., a logical switch, logical port, etc.) may have two or more conflicting configuration settings that need to be resolved. Rather than performing the computation of the actual configuration setting to use for numerous logical entities at a central bottleneck (e.g., a network manager and/or network controller), some embodiments distribute the conflicting configuration settings and their sources to the host computers that implement the logical network entities (e.g., to local controllers executing on these host computers).

In some embodiments, a network management and control system enables users (e.g., network administrators, security administrators, etc.) to modify configuration settings for entities of a logical network. The logical network may include various entities, such as logical forwarding elements (e.g., logical switches and logical routers), logical ports, network endpoints (e.g., virtual machines (VMs), containers, and/or other data compute nodes (DCNs)), etc. These logical forwarding elements are implemented across one or more datacenters by managed forwarding elements, such as software forwarding elements that execute on host computers (e.g., in virtualization software executing on the host computers).

The network management and control system may include different types of users, such as networking administrators and security administrators, and allow these different types of users to configure different types of entities. For instance, in some embodiments, a networking administrator is able to configure settings of logical forwarding elements and logical ports, while a security administrator can define security rules for the network but cannot directly modify the logical networking entity configuration. To define security rules, some embodiments provide group objects that the security administrator defines and to which the security administrator adds networking entities (e.g., logical ports, virtual interfaces, IP addresses, MAC addresses, etc.). Though the security administrator cannot directly modify the networking configuration, they may use aspects of the networking configuration (e.g., certain configuration settings for a networking object). For instance, the IP discovery setting for a logical port specifies the way in which the IP address associated with that port (e.g., the IP address of a VM or virtual interface associated with that port) will be discovered. These IP addresses are used in security rules in some embodiments.

Rather than enabling the security administrator to directly access and modify the logical networking entities, some embodiments allow the security administrator to define group objects and apply configuration profiles to these group objects. These configuration profiles specify configuration settings (e.g., an IP discovery mode) for the members of the group objects to which the profiles are applied. Through these groups, the security administrator is able to modify certain configuration settings of the logical networking entities without direct access to the entities.

In some embodiments, the group membership may be defined statically or dynamically (or a combination of the two). Static membership involves a user specifying a particular entity as a member of the group, while dynamic membership involves the user specifying a set of criteria (e.g., based on an entity name, a tag for the entity, etc.) for the group such that any entities that match the criteria are added as members of the group. As entities are created, deleted, or modified, the membership of a group may change. In addition, a first group may be a static and/or dynamic member of a second group in some embodiments (so that the members of the first group are all members of the second group), such that the dynamic membership of one group can affect the membership of another group.

Because different users may apply configuration to the same logical networking entity in different ways (and through different groups a single user might end up applying multiple configurations to the same entity), these configuration settings may conflict at times. Some embodiments therefore require that the application of a configuration setting profile to a group includes a priority value. For an entity with multiple conflicting configuration settings, the highest priority setting takes precedence. In some embodiments, direct application of a configuration setting to a logical networking entity (e.g., by a networking administrator that has direct access to the logical networking entity) automatically takes precedence over even the highest profile application of a profile to a group that includes the entity.

In a system with numerous (e.g., thousands or even millions) logical network entities, many of which are in multiple different groups, determining the effective configuration setting for each of these entities can be a resource-intensive process. As such, rather than having the central network manager or controller determine the configuration to be applied to each logical network entity, some embodiments provide all of the configuration data for at least a set of the entities to any host computer implementing that entity and allow the host computer to determine the actual configuration for the entity. For instance, for certain logical port configuration settings (e.g., the IP discovery setting), only a single host computer needs to determine these configuration settings for a particular logical port (i.e., the host computer hosting the VM attached to the logical port). Having each host computer evaluate the different groups, applications of profiles, etc. for its own logical ports is more efficient than having the central controller perform this evaluation for all of the logical ports. In some embodiments, the central controller (or central network manager) evaluates the membership for each group (i.e., the entities that belong to the group) and uses the membership for a group to determine that group's span (i.e., the host computers that require implement the members for the group and therefore require configuration data for the group). The group information and the application of configuration profiles to the group can then be provided to the appropriate host computers in order for those host computers to evaluate the configuration settings for the logical entities that they implement.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for resolving conflicting configuration settings for logical network entities that pushes the determination of effective configuration for these logical network entities down to the host computers that implement the entities. Specifically, as a result of different ways of a network management and control system receiving configuration data for the logical network entities, a particular entity (e.g., a logical switch, logical port, etc.) may have two or more conflicting configuration settings that need to be resolved. Rather than performing the computation of the actual configuration setting to use for numerous logical entities at a central bottleneck (e.g., a network manager and/or network controller), some embodiments distribute the conflicting configuration settings and their sources to the host computers that implement the logical network entities (e.g., to local controllers executing on these host computers).

In some embodiments, a network management and control system enables users (e.g., network administrators, security administrators, etc.) to modify configuration settings for entities of a logical network. The logical network may include various entities, such as logical forwarding elements (e.g., logical switches and logical routers), logical ports, network endpoints (e.g., virtual machines (VMs), containers, and/or other data compute nodes (DCNs), etc. These logical forwarding elements are implemented across one or more datacenters by managed forwarding elements, such as software forwarding elements that execute on host computers (e.g., in virtualization software executing on the host computers).

Figure 1:
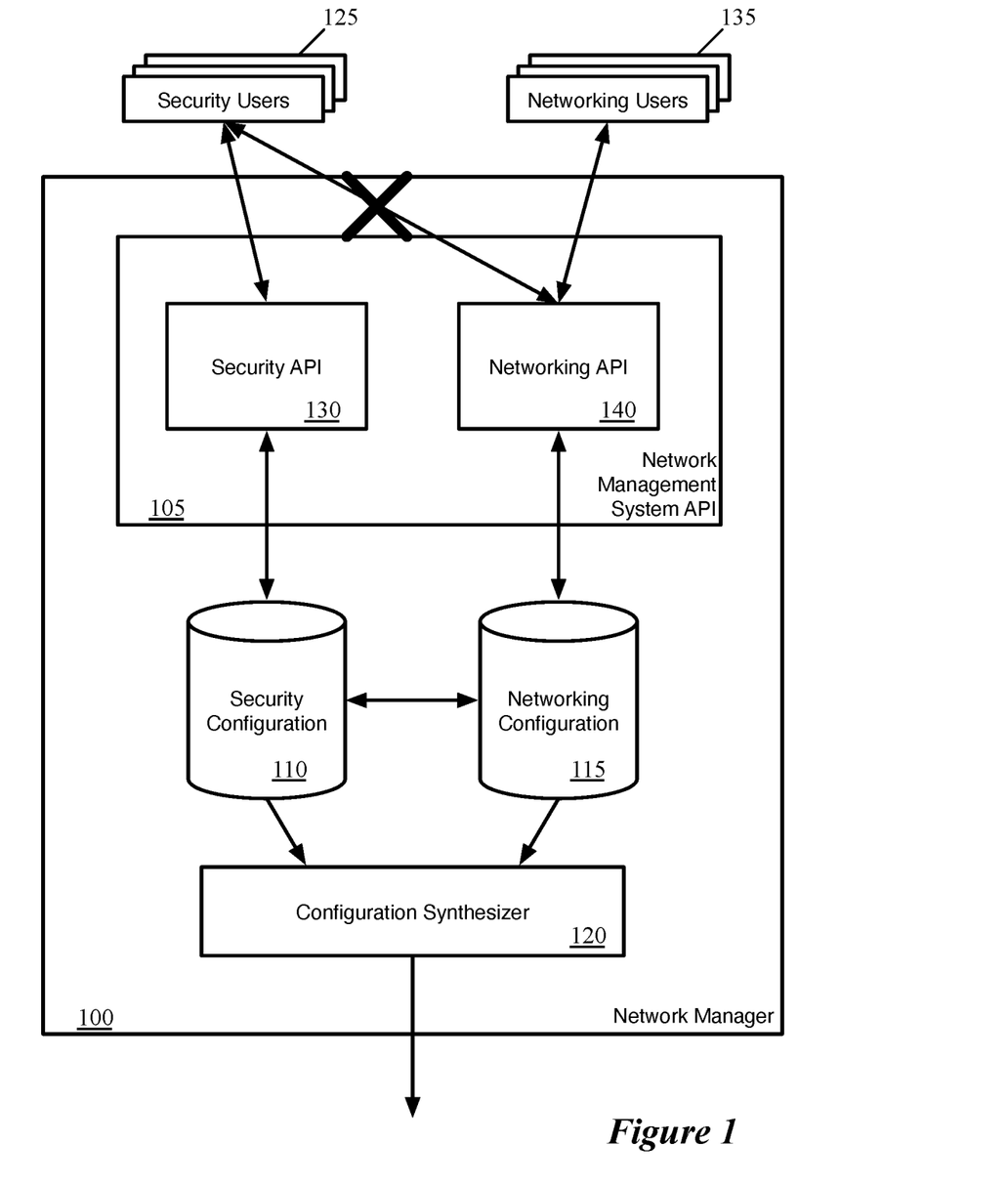
FIG. 1 conceptually illustrates a network manager of some embodiments that receives configuration data from users, stores this configuration data, and provides the configuration data to host computers.

FIG. 1 conceptually illustrates a network manager 100 of some embodiments that receives configuration data from users, stores this configuration data, and provides the configuration data to host computers (e.g., via a set of network controllers). In some embodiments, the network manager 100 is part of a network management and control system (e.g., as described below by reference to FIG. 6) that operates to manage a set of logical networks implemented in a datacenter (or across multiple datacenters). The network manager 100 executes on a computing device in some embodiments (e.g., on a physical device, within a virtual machine, etc.). In addition, while a single network manager 100 is shown in the figure, the network management and control system of some embodiments includes multiple network managers (e.g., operating in a cluster within a datacenter, with one or more network managers per datacenter for a multi-datacenter network, etc.).

As shown, the network manager 100 includes a network management system application programming interface (API) 105, security configuration data 110, networking configuration data 115, and a configuration synthesizer 120. It should be understood that the network managers of some embodiments may include various different modules not shown in this figure that perform various functions. For instance, the network managers might include interfaces for communicating with other network managers, network controllers, and/or host computers, modules for responding to queries, etc.

The network management system API 105 defines how users can communicate with the network manager 100 to create, delete, and modify configuration data for the logical networks managed by the network management system. In some embodiments, different types of users of the network management and control system (e.g., networking administrators and security administrators) are provided with different sets of APIs that allow the users to only access and modify certain types of data (these restrictions may be referred to as role-based access control). Specifically, certain entities and settings may only be viewed, created, modified, and deleted by security users 125 via the security API 130, while other entities and settings may only be viewed, created, modified, and deleted by networking users 135 via the networking API 140.

For example, in some embodiments, the networking API 140 allows networking users 135 to configure settings for logical forwarding elements (e.g., logical switches and routers) and logical ports of these logical forwarding elements. The networking API 140 allows for the connection of these logical forwarding elements, definition of static routes and BGP settings for logical routers, determination of which logical switch subnets to advertise externally, and configuration of IP discovery settings for logical ports and/or logical switches (i.e., for all ports on a logical switch), among other settings. This networking configuration data 115 is stored by the network manager 100 in some embodiments.

The security API 130 allows security users 125 to define security rules (e.g., firewall rules) for the network as well as to define groups of logical network entities, in addition to other items. The groups of logical entities are used to define the security rules in some embodiments; rather than specifying every single source and destination IP address (which may not even be known to the security administrator) for a rule, the security administrator can define a group of logical entities fitting a set of criteria and then use that group as the source or destination criteria for a rule. In some embodiments, the security administrator can use logical networking entities in these groups for the firewall rules (e.g., groups of logical ports, virtual interfaces, VMs, MAC or IP addresses, etc.), but may not modify the actual logical networking entity configuration. Much like the networking configuration data 115, the security configuration data 110 is also stored by the network manager 100. As noted, these sets of configuration data may reference each other (e.g., the security groups referencing logical networking entities).

Figure 2:
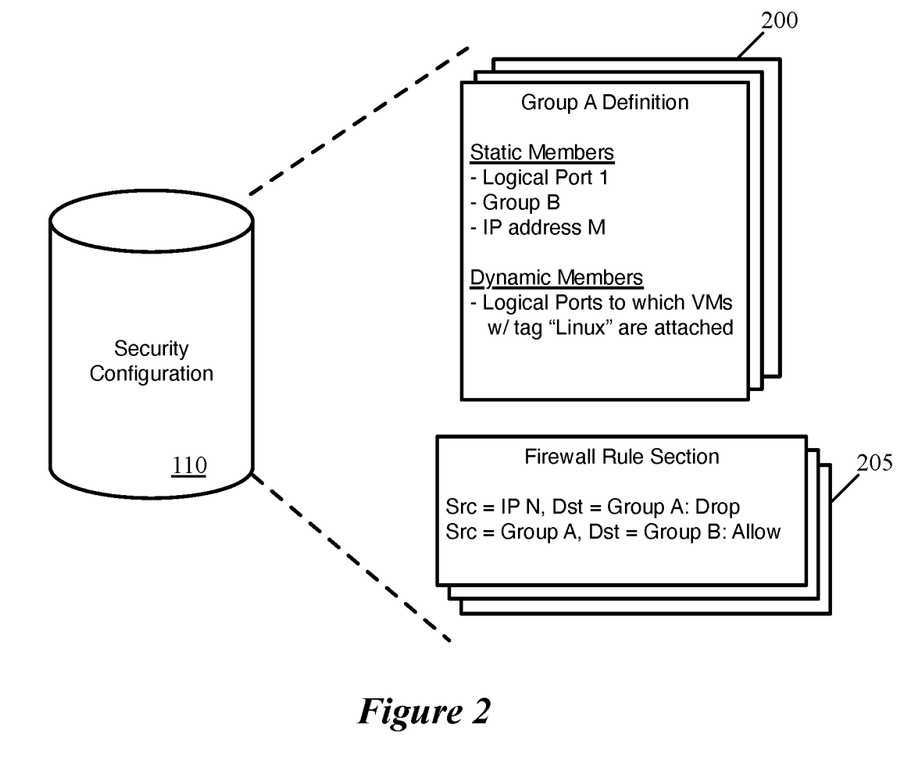
FIG. 2 conceptually illustrates a portion of the security configuration data of some embodiments.

FIG. 2 conceptually illustrates a portion of this security configuration data 110 of some embodiments. As shown, the security configuration data 110 includes group definitions 200 as well as firewall rules 205. The group definitions, in some embodiments, specify membership of each group. In some embodiments, the group membership may be defined statically, dynamically, or a combination of the two. Static membership involves a user specifying a particular entity as a member of the group, while dynamic membership involves the user specifying a set of criteria for the group such that any entities that match the criteria are added as members of the group. In addition, a first group may be static and/or dynamic member of a second group in some embodiments, such that the members of the first group are all members of the second group. In this case, the dynamic membership of one group can affect the membership of another group.

In the example shown in the figure, the definition 200 for Group A includes three static members: a logical port, another Group, and an IP address. Groups need not be homogenous, in that a single group can include various different types of entities (although when used in firewall rules, these entities are all eventually translated into addresses, such as IP or MAC addresses). In some embodiments, the members of a group can be IP and/or MAC addresses, logical ports, logical switches (which translate to the logical ports of that logical switch), physical entities (e.g., host computers that translate to a physical interface with physical IP and/or MAC addresses), virtual interfaces, DCNs (e.g., VMs, containers, etc.), active directory groups, and other groups defined by the security administrator.

The definition for group B also includes criteria for dynamic membership, specifying that all logical ports to which VMs with the tag "Linux" are attached are members. Assuming that all Linux VMs in the logical network are correctly tagged, this could be a large number of members (and one that changes regularly). With dynamic group membership criteria, as entities are created, deleted, or modified in the network, the membership of a group may change. In some embodiments, the criteria for dynamic membership may be based on tags (i.e., metadata assigned to entities by a user), names for entities within the system (e.g., the name starting with a string, ending with a string, or containing a string), or other types of criteria.

The firewall rules 205 are configured as sections (i.e., groups of rules with internal priorities) in some embodiments. In this example, the shown firewall rule section includes (i) a rule specifying that data messages having a source IP address N and any destination IP address in Group A are dropped and (ii) a rule specifying that data messages having any source IP address in Group A and any destination IP address in Group B are allowed.

As described below, in some embodiments the network manager does not evaluate the group membership or translate firewall rules into IP addresses that can be evaluated by the managed forwarding elements that implement the logical network, but instead passes the configuration data down to a centralized network controller set that performs this evaluation. Returning to FIG. 1, the configuration synthesizer 120 combines the networking configuration 115 and security configuration 110 and provides this to, e.g., a set of centralized network controllers.

As noted, the security administrator cannot directly modify the networking configuration in some embodiments. However, these users may nevertheless use or rely on certain aspects of the networking configuration (e.g., certain configuration settings for a networking object). For instance, the IP discovery setting for a logical port specifies the way in which the IP address associated with that port (e.g., the IP address of a VM or virtual interface associated with that port) will be discovered by the network management and control system. These IP addresses are often used in security rules in some embodiments, and thus are needed for the firewall rules to be implemented properly by the physical network. However, the network administrator may not set the IP discovery (or other configuration settings) in a way that will retrieve these IP addresses as quickly as may be desired for security purposes.

Rather than enabling the security administrator to directly access and modify the logical networking entities, some embodiments allow the security administrator to define group objects not just for use in firewall rules, but also in order to apply configuration profiles to these group objects. These configuration profiles specify configuration settings (e.g., an IP discovery mode) for the members of the group objects to which the profiles are applied. Through these groups, the security administrator is able to modify certain configuration settings of the logical networking entities without direct access to the entities.

Figure 3:
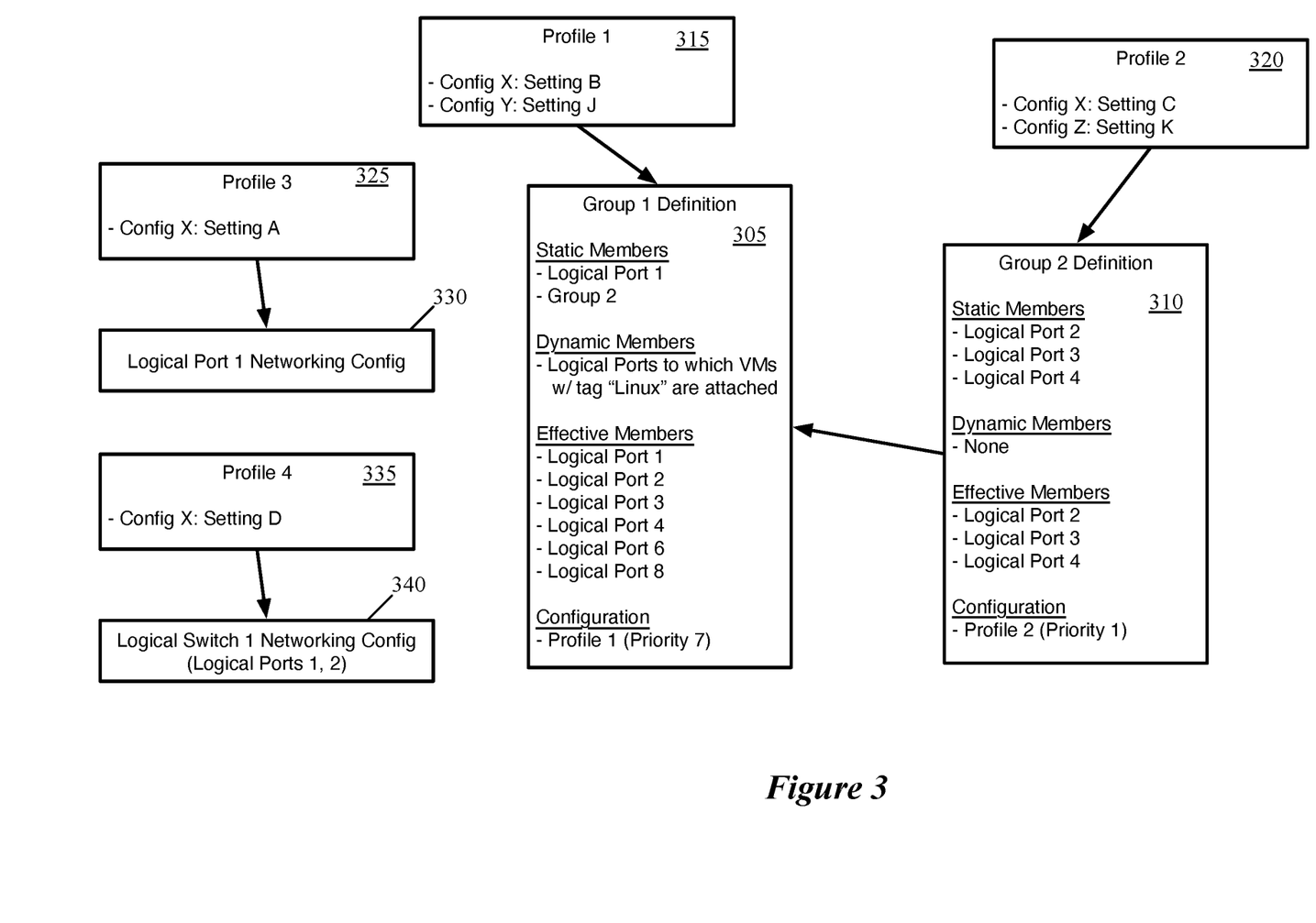
FIG. 3 conceptually illustrates the application of various configuration settings to logical ports through different mechanisms, including the application of profiles to groups of logical ports as defined by a security administrator.

FIG. 3 conceptually illustrates the application of various configuration settings to logical ports through different mechanisms, including the application of profiles to groups of logical ports as defined by a security administrator. This figure shows two group definitions 305 and 310 for Groups 1 and 2 respectively. Group 1 has two static members (Logical Port 1 and Group 2) as well as a dynamic membership criteria specifying that all logical ports to which VMs with the tag "Linux" are attached are members. Group 2 has three static members (Logical Ports 2, 3, and 4), and no dynamic membership criteria.

The definitions 305 and 310 also specify the effective membership of each group, which may not be the definition as stored at the network manager in some embodiments. For Group 2, this effective membership is the same as the static membership (Logical Ports 2, 3, and 4), because there is no dynamic membership criteria. For Group 1, the effective membership includes Logical Port 1 (based at least on the static membership), Logical Ports 2, 3, and 4 (based at least on the membership of Group 2), and Logical Ports 6 and 8 (based on the dynamic membership criteria of Group 1).

In addition, configuration profiles are applied to each of the groups. As shown, a first configuration profile 315 is applied to Group 1 and a second configuration profile 320 is applied to Group 2. The first configuration profile 315 specifies a configuration setting B for a configuration aspect X and a setting J for a configuration aspect Y. This means that all of the effective members of Group 1 will have these settings applied (assuming they are not in conflict with higher priority settings, as discussed below). The second configuration profile 320 specifies a configuration setting C for the configuration aspect X (in conflict with the first configuration profile 315) and a configuration setting K for a configuration aspect Z. A configuration setting, in this case, is a specific setting (e.g., a value) for a particular type of configuration. For instance, for the configuration aspect of IP discovery, a specific setting might be to use ARP snooping or to use DHCP snooping (or to not use either of these mechanisms). It should be noted that, while this example shows a single profile being applied to each group, in some embodiments multiple different configuration profiles can be applied to a single group.

The network management system also allows users (e.g., networking administrator users) to apply configuration settings directly to the logical network entities. As shown in FIG. 3, a networking administrator has applied a configuration setting A for the configuration aspect X (represented as a configuration profile 325) directly to Logical Port 1 as part of its networking configuration 330 and has applied a configuration setting D for the configuration aspect X (represented as a configuration profile 335) directly to logical switch 1 as part of its networking configuration 340. This networking configuration also specifies that Logical Ports 1 and 2 are ports of this logical switch (and thus configuration setting D is indirectly applied to these logical ports).

As FIG. 3 indicates, the same logical networking entity may have differing configuration settings applied in various different ways. For instance, Logical Port 1 has three different settings for configuration aspect X applied: (i) direct configuration, (ii) through application of configuration to its logical switch, and (iii) through application of configuration to Group 1. These different settings may be applied by different users (e.g., a security administrator applying profiles to groups and a networking administrator directly configuring a logical port) or even by the same user in different ways (e.g., a networking administrator applying configuration to a logical switch without realizing that a logical port of the switch has already been directly configured, a security administrator applying profiles to multiple groups that both have a particular entity as a member). As a result, these configuration settings may conflict at times and need to be resolved. Some embodiments therefore require that the application of a configuration setting profile to a group includes a priority value, which is used to resolve these conflicts.

Figure 4:
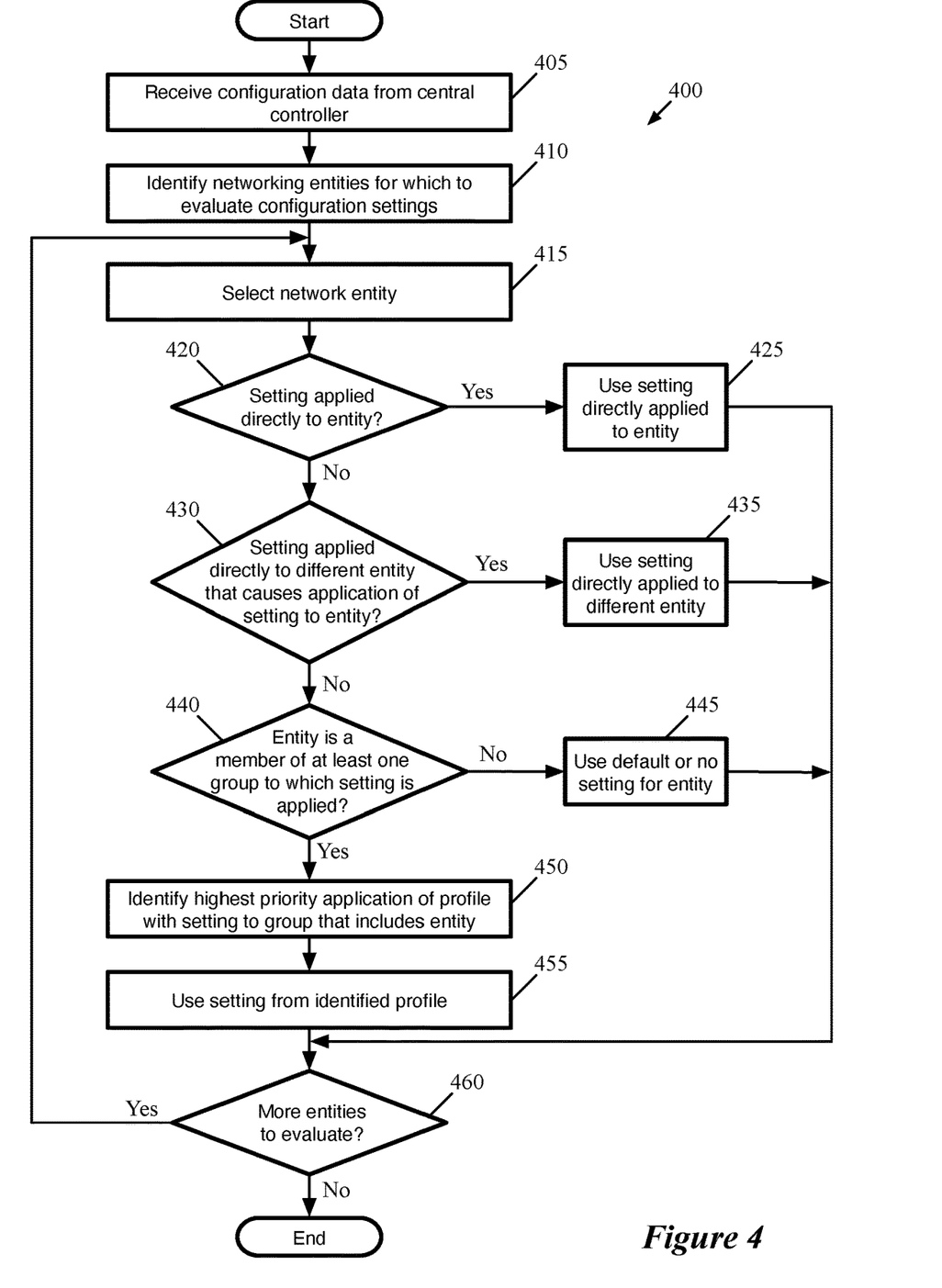
FIG. 4 conceptually illustrates a process of some embodiments for evaluating the configuration settings on a network entity.

FIG. 4 conceptually illustrates a process 400 of some embodiments for evaluating the configuration settings on a network entity. In some embodiments, the process 400 is performed by a host computer (e.g., by virtualization software executing at the host computer) rather than by the centralized aspects of the network management and control system. In a datacenter with thousands or even millions of logical network entities, many of which are in multiple different groups and/or have configuration applied directly (and that have different types of configuration settings), determining the effective configuration setting for each of these entities can be a resource-intensive process. As such, rather than having the central network manager or controllers determine the configuration to be applied to each logical network entity, some embodiments provide all of the configuration data for at least a set of the entities to any host computer implementing that entity and allow the host computer to determine the actual configuration for the entity.

For instance, for many logical port configuration settings (e.g., the IP discovery setting), only a single host computer needs to determine the effective configuration settings for a particular logical port (the host computer hosting the VM attached to that particular logical port). Having each host computer evaluate the different groups, applications of profiles, etc. for the logical port implemented at that host computer is more efficient than having the central network manager or network controller perform this evaluation for all of the logical ports.

Figure 5:
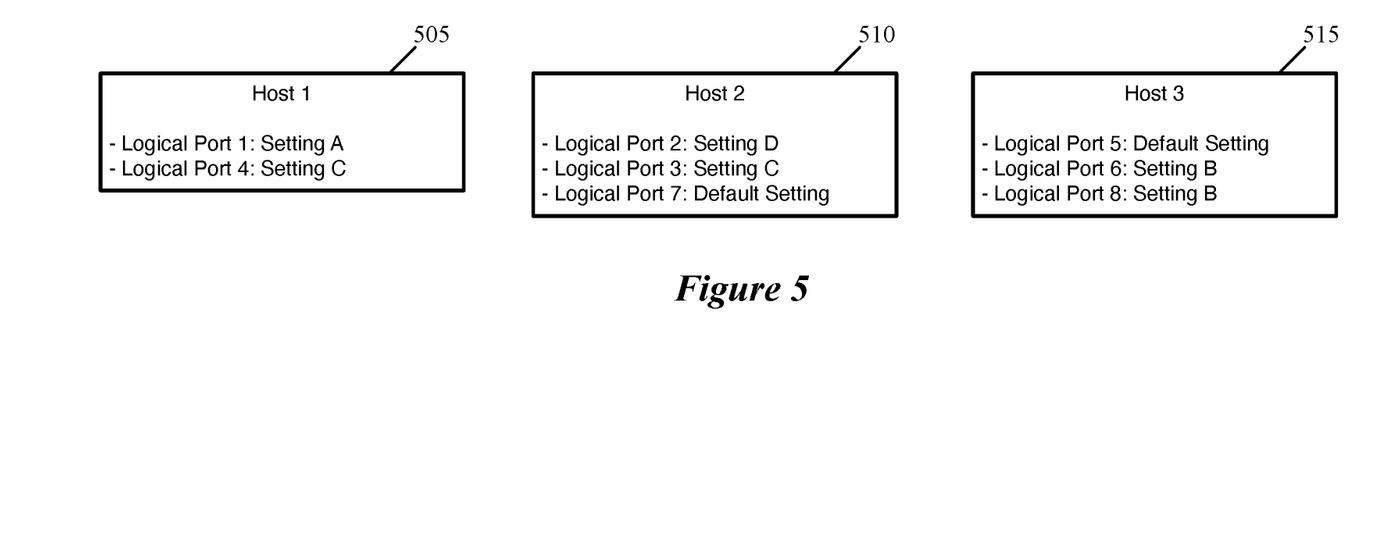
FIG. 5 conceptually illustrates the effective configuration settings for a configuration aspect for logical ports as shown in FIG. 3, as evaluated at the respective host computers for each logical port.

The process 400 will be described in part by reference to FIGS. 3 and 5. FIG. 3 is described above, and FIG. 5 conceptually illustrates the effective configuration settings for configuration aspect X for Logical Ports 1-8, as evaluated at the respective host computers for each logical port.

As shown, the process 400 begins by receiving (at 405) configuration data from a central controller. In some embodiments, this configuration data includes various logical network configuration information, including group definitions and applications of profiles to those groups, as well as configuration specifications directly applied to the logical network entities. In some embodiments, the group definitions include the effective membership for each group in terms of the network addresses that belong to each group, which may have been evaluated by a central network manager or controller. Additional configuration data, such as firewall rules to be applied, relevant logical network topology information, etc. is also received by the host computer. It should be noted that the process 400 is performed by many host computers in some embodiments, each of which receives a different set of configuration data from the central network controllers. In addition, each of these host computers may perform process 400 (or a similar process) whenever configuration data is updated and distributed to the host computer.

The process 400 then identifies (at 410) the network entities for which to evaluate configuration settings. In some embodiments, these are entities that are implemented on the host computer and to which the configuration settings apply on the host computer. For example, a single logical switch may be implemented on many host computers (e.g., hundreds or thousands), but the IP discovery setting applied to the logical switch is only important in the context of the logical ports of that logical switch, and thus is only important on the host computers hosting DCNs associated with those logical ports. Similarly, these many hundreds or thousands of host computers need to have some amount of configuration data regarding all of the logical ports of the logical switch, but each host computer only needs to evaluate the IP discovery setting for the logical ports associated with DCNs executing on that host computer. For instance, in the example of FIG. 5, a first host computer 505 evaluates the configuration setting for Logical Ports 1 and 4, a second host computer 510 evaluates the configuration setting for Logical Ports 2, 3, and 7, and a third host computer 515 evaluates the configuration setting for Logical Ports 5, 6, and 8.

Next, the process 400 selects (at 415) one of the identified network entities. It should be noted that the process 400 is a conceptual process, and that in some embodiments the host computer actually evaluates the effective configuration to apply to many network entities in parallel, rather than serially as shown. Furthermore, it should be noted that the process 400 only evaluates a single configuration aspect for the network entities, but in many cases, there are numerous configuration aspects for which the same or similar evaluation is performed.

The process 400 then determines the appropriate configuration setting for the selected network entity. In some embodiments, for an entity with multiple conflicting configuration settings, the highest priority setting takes precedence. In some embodiments, direct application of a configuration setting to a logical networking entity (e.g., by a networking administrator that has direct access to the logical networking entity) automatically takes precedence over even the highest profile application of a profile to a group that includes the entity.

The process 400 therefore determines (at 420) whether a configuration setting is applied directly to the network entity. If so, the process 400 uses (at 425) that setting that is directly applied to the entity as the effective configuration setting for the entity, and proceeds to 460, described below. In the example of FIG. 3, the configuration setting A for configuration aspect X is applied directly to Logical Port 1. Such direct application of a configuration setting is given the highest priority, and therefore FIG. 5 shows that the first host computer 505 identifies setting A as the configuration setting for Logical Port 1.

If no configuration setting is applied directly to the selected network entity (e.g., the networking administrator left the default setting applied), the process 400 determines (at 430) whether a configuration setting is applied directly to a different entity that causes application of the setting to the selected entity. For instance, when evaluating logical ports, at least certain configuration settings applied to a logical switch are automatically applied to all of the logical ports of the logical switch (e.g., IP discovery configuration, DHCP configuration, etc.). If so, the process uses (at 435) that setting that is directly applied to the other logical entity, and proceeds to 460, described below. In FIG. 3, the configuration setting D for configuration aspect X is applied directly to Logical Switch 1, which includes Logical Ports 1 and 2. For Logical Port 1, configuration setting D is of lower priority than configuration setting A, which is applied more directly to the logical port itself. However, for Logical Port 2, the second host computer 510 identifies setting D as the highest-priority configuration setting, as shown in FIG. 5.

If no configuration setting is applied directly either to the selected network entity or to any entities that cause application of the setting to the selected network entity (e.g., the networking administrator left the default setting applied for all such entities), then the process 400 determines (at 440) whether the entity is a member of at least one (but possibly more than one) group to which a configuration setting is applied. If not, then no specific configuration setting has been applied to the entity for this configuration aspect, and the process 400 uses (at 445) a default setting or no setting at all for the selected network entity and proceeds to 460, described below.

When the entity is a member of at least one group to which a configuration setting is applied via a configuration profile, the process 400 identifies (at 450) the highest priority application of a profile that includes a configuration setting for the configuration aspect being evaluated to a group that includes the selected entity and uses (at 455) the configuration setting from the identified profile. In some embodiments, when a user applies a configuration profile to a group, the network management system API requires that this application of the configuration profile be assigned a priority. In the example shown in FIG. 3, the first configuration profile 315 is applied to Group 1 with a priority of 7 while the second configuration profile 320 is applied to Group 2 with a higher priority of 1 (lower numbers indicating higher priorities). As a result, as shown in FIG. 5, the first host computer 505 identifies setting C as the highest-priority configuration for Logical Port 4 and the second host computer 510 identifies setting C as the highest-priority configuration for Logical Port 3. While both the first configuration profile 315 and the second configuration profile 320 are applied to these logical ports, the application of the second configuration profile 320 has a higher priority and thus its configuration settings are selected in conflicts between the two. On the other hand, for Logical Ports 6 and 8, only the first configuration profile 315 is applied and thus the third host computer 515 identifies setting B for these logical ports. Lastly, Logical Ports 5 and 7 do not have any specific configurations applied, so the second and third host computers 510 and 515 respectively identify the default setting for this configuration aspect for these two logical ports.

Lastly, the process 400 determines (at 460) whether any more network entities remain to evaluate. If additional entities remain, the process 400 returns to 415 to select the next network entity. Otherwise, the process 400 ends. As noted above, this is a conceptual process, and in some embodiments the configurations for many or all of the entities are evaluated in parallel.

Figure 6:
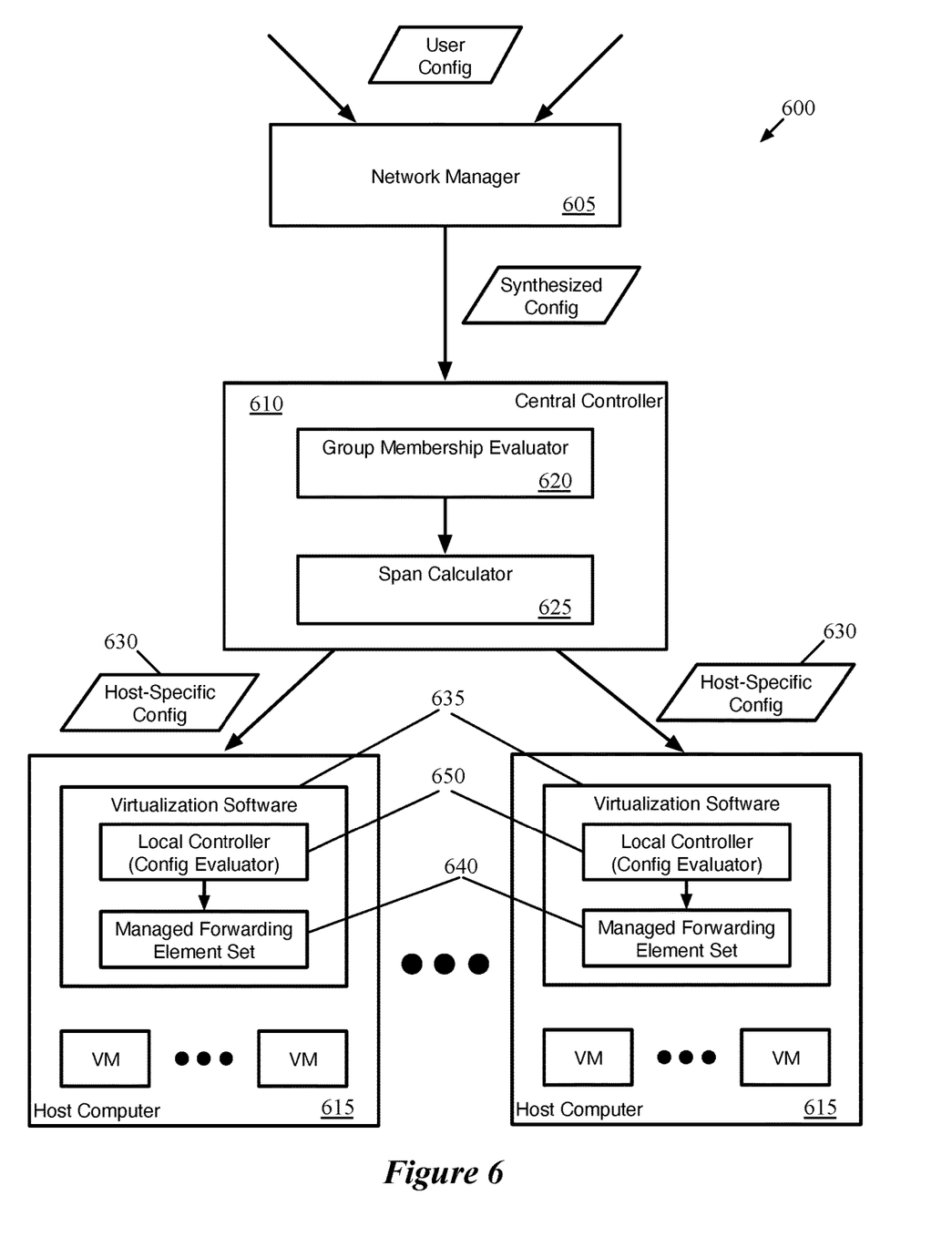
FIG. 6 conceptually illustrates a network management and control system of some embodiments.

FIG. 6 conceptually illustrates a network management and control system 600 of some embodiments for implementing the above-described invention. As shown, the system 600 includes a network manager 605, a central controller 610, and a set of host computers 615. The network manager 605 may be a single network manager, a cluster of network managers, or a distributed set of network managers (e.g., distributed across multiple datacenters) that collectively implement a management plane. The network managers 605 of some embodiments receive network configuration data (e.g., group definitions, profile definitions, application of profiles to groups, logical network architecture, firewall rules, configuration settings for logical network entities and groups, etc.). These network managers are described in detail above by reference to FIG. 1.

The central network controller 610 includes (among other modules that are not shown) a group membership evaluator 620 and a span calculator 625. Like the network manager 605, the central controller 610 may be a single controller, a controller cluster, or a distributed set of controllers (e.g., distributed across multiple datacenters) that collectively implement a central control plane. The group membership evaluator 620 evaluates the membership of dynamic groups by determining all of the logical entities that match the membership criteria. In addition, the group membership evaluator 620 of some embodiments flattens the group membership to account for groups that are members of other groups. For instance, in the example of FIG. 3, the group membership evaluator determines the effective membership of the first group by (i) identifying the dynamic members based on the specified tag criteria and (ii) accounting for the membership of the second group that is a member of the first group. In some embodiments, the central controller 610 (e.g., either the group membership evaluator or a different module) also determines the IP and/or MAC addresses for firewall rules that use groups based on the member entities of the groups.

The span calculator 625 determines the span of each logical entity (i.e., the set of host computers that require configuration data for the logical entity). For many aspects of logical port configuration, only a single host computer needs to receive the configuration data (the host computer on which the DCN attached to the logical port is located). However, for logical switches, distributed logical routers, firewall rule sets, and other logical entities, the span is often a large number of host computers that requires further analysis by the span calculator 625. Based on this span calculation, the network controller 610 distributes host-specific configuration data 630 to each of the host computers 615.

The host computers 615 execute virtualization software 635 that enables the execution of one or more VMs (or other DCNs). As shown, among other modules, the virtualization software includes a local controller 650 and a managed forwarding element set 640. The local controller 650 receives the configuration data for its host computer 615 from the central controller 610 and uses this data to configure the managed forwarding element set 640. This configuration process includes converting the configuration data into a format particular to the type of managed forwarding elements executing on the host computer. These managed forwarding elements could be flow-based forwarding elements (e.g., Open vSwitch) or modular sets of forwarding elements (as on an ESXi host computer). In addition, the configuration process involves evaluating the actual configuration to apply to certain logical network entities implemented on the host computer (e.g., by performing the process 400 or a similar process). The managed forwarding element set 640 implements the logical network configuration (e.g., the logical forwarding elements, etc.) in order to process data messages sent to and from the VMs executing on the host computer 615.

Figure 7:
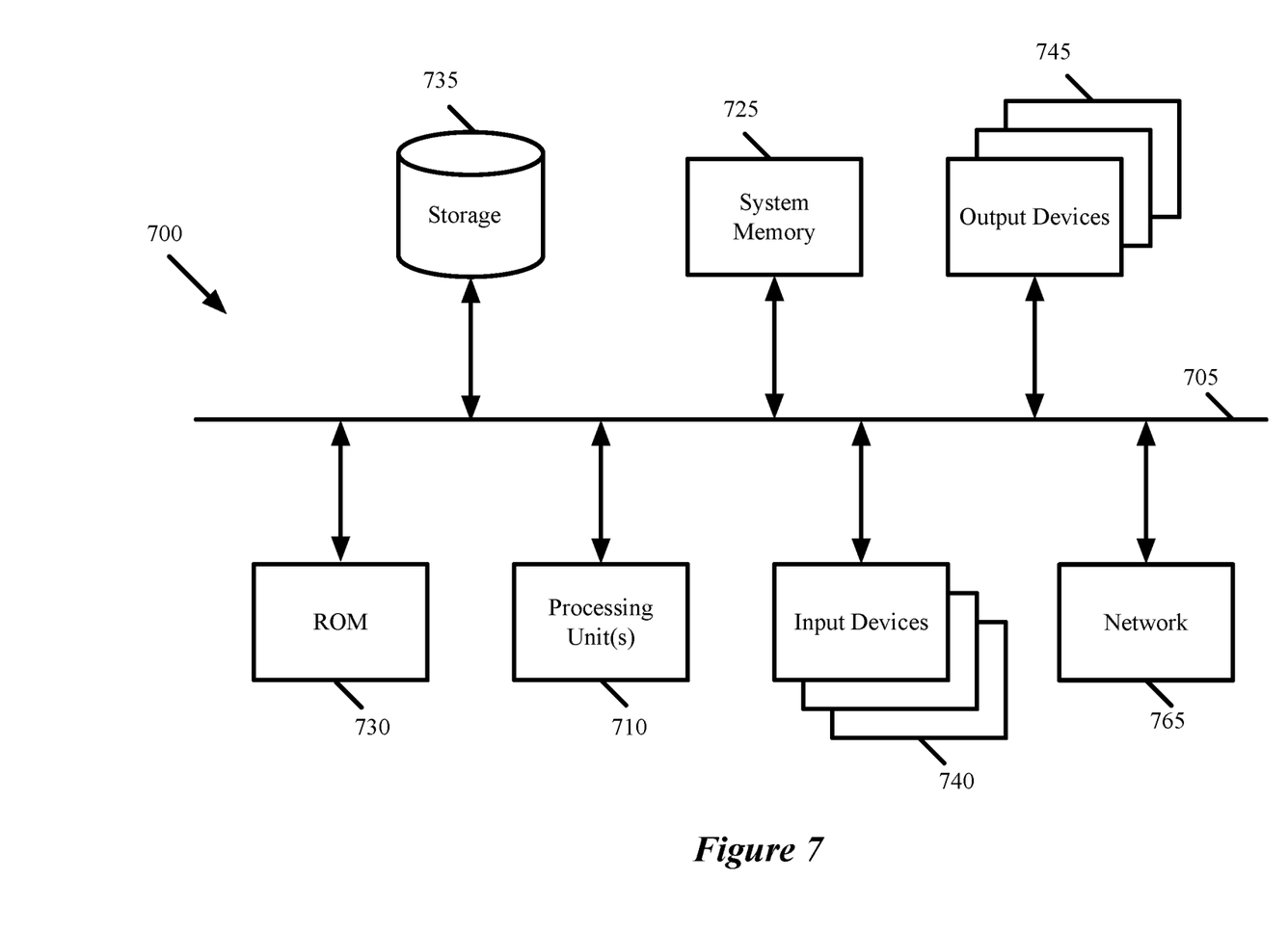
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random-access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for configuring logical network entities, the method comprising:
at a host computer:
receiving configuration data for a particular logical networking entity implemented at the host computer;
identifying that the configuration data for the particular logical networking entity comprises at least two conflicting configuration settings for the particular logical networking entity, at least one of the configuration settings for the particular logical networking entity based on association of a configuration profile to a group of logical entities that includes the particular logical networking entity; and
determining a particular one of the conflicting configuration settings with a highest priority to apply to the particular logical networking entity at the host computer.

2. The method of claim 1, wherein:
the method is performed by a local controller executing at the host computer; and
the local controller configures a set of managed forwarding elements also executing on the host computer to implement a plurality of logical networking entities including the particular logical networking entity.

3. The method of claim 2, wherein the configuration data is received from a central controller cluster that provides logical network entity configuration data to a plurality of host computers including the host computer.

4. The method of claim 3, wherein:
the central controller cluster identifies a span of the group based on the logical entities of the group; and
the span of the group comprises a set of host computers that implement at least one logical entity of the group, the set of host computers including the host computer.

5. The method of claim 1, wherein the group of logical entities is a dynamic group defined by a set of criteria, wherein logical networking entities that match the set of criteria are members of the group.

6. The method of claim 5, wherein the set of criteria specifies that logical networking entities to which a particular tag is applied are members of the group.

7. The method of claim 1, wherein:
the configuration profile is a first configuration profile and the group is a first group;
a first one of the conflicting configuration settings is based on the association of the first configuration profile to the first group of logical entities; and
a second one of the conflicting configuration settings is based on the association of a second configuration profile to a second group of logical entities that also includes the particular logical networking entity.

8. The method of claim 7, wherein the association of the first configuration profile with the first group has a higher priority than the association of the second configuration profile with the second group, wherein the first configuration setting is applied to the particular logical networking entity at the host computer.

9. The method of claim 7, wherein the first group is a member of the second group such that all logical entities that are members of the first group are also members of the second group.

10. The method of claim 1, wherein the conflicting configuration settings are IP discovery settings.

11. The method of claim 1, wherein:
a first one of the conflicting configuration settings is based on the association of the configuration profile to the group of logical entities; and
a second one of the conflicting configuration settings is based on direct association of the second configuration setting to the particular logical networking entity.

12. The method of claim 11, wherein the direct association of the second configuration setting to the particular logical networking has a higher priority than the association of the configuration profile to the group of logical entities.

13. The method of claim 1, wherein the configuration data is received from a network management and control system that enables users to configure the logical network entities.

14. The method of claim 13, wherein a first user provides a first one of the conflicting configuration settings and a second user provides a second one of the conflicting configuration settings.

15. The method of claim 13, wherein:
users of a first type are not provided with direct access to a set of logical networking entities and users of a second type are provided with direct access to the set of logical networking entities; and
users of the first type are provided with an ability to configure the set of logical networking entities by defining groups of logical entities and associating configuration profiles with the groups of logical networking entities.

16. The method of claim 15, wherein the first type of users are security users that define security configuration for a logical network and the second type of users are networking users that define networking configuration for the logical network.

17. A non-transitory machine-readable medium storing a program which when executed by at least one processing unit of a host computer configures logical network entities, the program comprising sets of instructions for:
receiving configuration data for a particular logical networking entity implemented at the host computer;
identifying that the configuration data for the particular logical networking entity comprises at least two conflicting configuration settings for the particular logical networking entity, at least one of the configuration settings for the particular logical networking entity based on association of a configuration profile to a group of logical entities that includes the particular logical networking entity; and
determining a particular one of the conflicting configuration settings with a highest priority to apply to the particular logical networking entity at the host computer.

18. The non-transitory machine-readable medium of claim 17, wherein:
the program is a local controller application that configures a set of managed forwarding elements also executing on the host computer to implement a plurality of logical networking entities including the particular logical networking entity; and
the configuration data is received from a central controller cluster that provides logical network entity configuration data to a plurality of host computers including the host computer.

19. The non-transitory machine-readable medium of claim 17, wherein:
the group of logical entities is a dynamic group defined by a set of criteria; and
logical networking entities that match the set of criteria are members of the group.

20. The non-transitory machine-readable medium of claim 17, wherein:
the configuration profile is a first configuration profile and the group is a first group;
a first one of the conflicting configuration settings is based on the association of the first configuration profile to the first group of logical entities; and
a second one of the conflicting configuration settings is based on the association of a second configuration profile to a second group of logical entities that also includes the particular logical networking entity.

21. The non-transitory machine-readable medium of claim 17, wherein:
a first one of the conflicting configuration settings is based on the association of the configuration profile to the group of logical entities;
a second one of the conflicting configuration settings is based on direct association of the second configuration setting to the particular logical networking entity; and
the direct association of the second configuration setting to the particular logical networking has a higher priority than the association of the configuration profile to the group of logical entities.

22. The non-transitory machine-readable medium of claim 17, wherein:
the configuration data is received from a network management and control system that enables users to configure the logical network entities; and
a first user provides a first one of the conflicting configuration settings and a second user provides a second one of the conflicting configuration settings.

23. The non-transitory machine-readable medium of claim 22, wherein:
users of a first type are not provided with direct access to a set of logical networking entities and users of a second type are provided with direct access to the set of logical networking entities; and
users of the first type are provided with an ability to configure the set of logical networking entities by defining groups of logical entities and associating configuration profiles with the groups of logical networking entities.

24. The non-transitory machine-readable medium of claim 23, wherein the first type of users are security users that define security configuration for a logical network and the second type of users are networking users that define networking configuration for the logical network.

* * * * *